United States Patent
Lei et al.

(10) Patent No.: US 11,922,440 B2
(45) Date of Patent: Mar. 5, 2024

(54) DEMAND FORECASTING USING WEIGHTED MIXED MACHINE LEARNING MODELS

(71) Applicant: Oracle International Corporation, Redwood Shores, CA (US)

(72) Inventors: Ming Lei, Ellicott City, MD (US); Catalin Popescu, Atlanta, GA (US)

(73) Assignee: Oracle International Corporation, Redwood Shores, CA (US)

(*) Notice: Subject to any disclaimer, the term of this patent is extended or adjusted under 35 U.S.C. 154(b) by 611 days.

(21) Appl. No.: 15/799,115

(22) Filed: Oct. 31, 2017

(65) Prior Publication Data
US 2019/0130425 A1    May 2, 2019

(51) Int. Cl.
*G06Q 30/0202* (2023.01)
*G06N 20/00* (2019.01)
(Continued)

(52) U.S. Cl.
CPC ......... *G06Q 30/0202* (2013.01); *G06N 20/00* (2019.01); *G06Q 10/0631* (2013.01); *G06Q 30/0201* (2013.01)

(58) Field of Classification Search
CPC .............................................. G06Q 30/0202
See application file for complete search history.

(56) References Cited

U.S. PATENT DOCUMENTS

| 8,620,707 B1 | 12/2013 | Belyi et al. |
| 10,417,650 B1* | 9/2019 | Gong ................. G06Q 30/0202 |

(Continued)

FOREIGN PATENT DOCUMENTS

| CN | 104040548 A | 9/2014 |
| CN | 105787265 A | 7/2016 |

(Continued)

OTHER PUBLICATIONS

Caldiera, J.F., Moura G.V., Santos A.A.P., Predicting the yield curve using forecast combinations, 2016, Computational Statistics and Data Analysis, 100, pp. 79-98 (Year: 2016).*

(Continued)

*Primary Examiner* — Brian M Epstein
*Assistant Examiner* — Sara Grace Brown
(74) *Attorney, Agent, or Firm* — Potomac Law Group, PLLC (57) ABSTRACT

Embodiments forecast demand of an item by receiving historical sales data for the item for a plurality of past time periods including a plurality of features that define one or more feature sets. Embodiments use the feature sets as inputs to one or more different algorithms to generate a plurality of different models. Embodiments train each of the different models. Embodiments use each of the trained models to generate a plurality of past demand forecasts for each of some or all of the past time periods. Embodiments determine a root-mean-square error ("RMSE") for each of the past demand forecasts and, based on the RMSE, determine a weight for each of the trained models and normalize each weight. Embodiments then generate a final demand forecast for the item for each future time period by combining a weighted value for each trained model.

18 Claims, 5 Drawing Sheets

(51) Int. Cl.
*G06Q 10/0631* (2023.01)
*G06Q 30/0201* (2023.01)

(56) References Cited

U.S. PATENT DOCUMENTS

| | | | |
|---|---|---|---|
| 10,453,026 B2* | 10/2019 | Ray | G06Q 30/0202 |
| 2005/0288993 A1 | 12/2005 | Weng et al. | |
| 2009/0216611 A1* | 8/2009 | Leonard | G06Q 30/02 |
| | | | 705/7.31 |
| 2013/0346150 A1 | 12/2013 | Beddo et al. | |
| 2014/0108094 A1* | 4/2014 | Beddo | G06Q 10/067 |
| | | | 705/7.31 |
| 2014/0201126 A1* | 7/2014 | Zadeh | A61B 5/165 |
| | | | 706/52 |
| 2015/0095111 A1* | 4/2015 | Tang | G06Q 30/0202 |
| | | | 705/7.31 |
| 2015/0127419 A1* | 5/2015 | Tiwari | G06F 16/24578 |
| | | | 705/7.29 |
| 2015/0134413 A1 | 5/2015 | Deshpande et al. | |
| 2016/0048766 A1* | 2/2016 | McMahon | G06N 5/047 |
| | | | 706/12 |
| 2016/0210591 A1 | 7/2016 | Lafrance | |
| 2016/0275413 A1* | 9/2016 | Shi | G06N 20/00 |
| 2016/0292324 A1* | 10/2016 | Leonard | G06F 30/20 |
| 2017/0068973 A1 | 3/2017 | Sinkel | |
| 2017/0083967 A1 | 3/2017 | Shiely et al. | |
| 2017/0169446 A1 | 6/2017 | Li et al. | |
| 2018/0222043 A1* | 8/2018 | Trovero | G06F 16/285 |
| 2018/0300737 A1* | 10/2018 | Bledsoe | G06F 16/248 |
| 2018/0374109 A1* | 12/2018 | Scarpati | G06N 7/00 |
| 2019/0012684 A1* | 1/2019 | Cui | H04N 21/25891 |

FOREIGN PATENT DOCUMENTS

| | | |
|---|---|---|
| CN | 106600032 A | 4/2017 |
| CN | 107291840 A | 10/2017 |
| JP | 2009104408 A | 5/2009 |
| JP | 2016099738 A | 5/2016 |
| WO | 2016073025 A1 | 5/2016 |

OTHER PUBLICATIONS

Ramos, Patrícia, and José Manuel Oliveira. "A procedure for identification of appropriate state space and ARIMA models based on time-series cross-validation." (2016). Algorithms 9.4: 76. (Year: 2016).*

Bergmeir, Christoph, and Jose M. Benitez. "Forecaster performance evaluation with cross-validation and variants." 2011 11th International Conference on Intelligent Systems Design and Applications. (Year: 2011).*

International Search Report issued in the corresponding international application No. PCT/US2018/051409; dated Dec. 6, 2018.

"Oracle Retail Demand Forecasting", Datasheet; Retrieved on Oct. 31, 2017 from www.oracle.com/us/products/applications/062067.pdf.

* cited by examiner

| week Index | 90 | 91 | 92 | 93 | 94 | 95 | 96 | 97 | 98 | 99 | Forecast Start 100 | 101 | 102 | 103 | 104 | 105 | 106 | 107 | 108 | 109 | 110 | 111 | 112 | 113 | 114 | 115 | 116 | 117 | 118 | 119 | 120 |
|---|---|---|---|---|---|---|---|---|---|---|---|---|---|---|---|---|---|---|---|---|---|---|---|---|---|---|---|---|---|---|---|
| Sales History | 28.7 | 22.6 | 22 | 22.9 | 25 | 20.6 | 28.4 | 21.4 | 38.7 | 43.8 | | | | | | | | | | | | | | | | | | | | | |
| Forecast (Linear regres) | 35.00 | 26.00 | 29.00 | 25.50 | 28.00 | 25.00 | 22.00 | 36.00 | 41.50 | 33.60 | 26.40 | 21.80 | 28.20 | 28.10 | 24.90 | 15.60 | 16.80 | 18.40 | 26.70 | 23.70 | 12.00 | 24.30 | 28.10 | 29.40 | 22.60 | 18.70 | 28.10 | 13.30 | 22.20 | 27.00 | 15.50 |
| Forecast(SVM) | 22.00 | 21.50 | 22.60 | 24.50 | 20.30 | 29.00 | 21.90 | 39.00 | 43.10 | 32.80 | | 12.00 | 13.40 | 27.20 | 25.30 | 18.70 | 27.20 | 22.30 | 27.70 | 12.50 | 24.30 | 24.40 | 16.60 | 20.50 | 11.50 | 27.80 | 27.40 | 23.90 | 18.50 | 25.50 | 28.60 |
| Forecast(ANN) | 24.00 | 23.00 | 21.80 | 24.80 | 20.50 | 26.00 | 22.00 | 38.60 | 43.00 | 33.00 | 12.50 | 29.10 | 11.90 | 13.30 | 10.00 | 29.80 | 11.30 | 21.60 | 28.50 | 28.30 | 28.00 | 22.50 | 12.80 | 25.40 | 20.10 | 20.20 | 26.20 | 27.10 | 14.80 | 21.20 | 18.80 |

Fig. 3

| week Index | 100 | 101 | 102 | 103 | 104 | 105 | 106 | 107 | 108 | 109 | 110 | 111 | 112 | 113 | 114 | 115 | 116 | 117 | 118 | 119 | 120 |
|---|---|---|---|---|---|---|---|---|---|---|---|---|---|---|---|---|---|---|---|---|---|
| Forecast (Linear regres) | 26.40 | 21.80 | 28.80 | 28.20 | 24.90 | 15.60 | 16.80 | 18.40 | 26.70 | 23.70 | 12.00 | 24.30 | 28.10 | 29.40 | 22.60 | 18.70 | 28.10 | 13.30 | 22.20 | 27.00 | 15.50 |
| Forecast (SVM) | 12.00 | 13.40 | 17.30 | 27.20 | 25.30 | 16.70 | 27.20 | 22.30 | 27.70 | 12.50 | 24.30 | 24.40 | 16.60 | 20.50 | 11.50 | 27.80 | 27.40 | 29.90 | 18.50 | 25.50 | 28.60 |
| Forecast(ANN) | 12.50 | 29.10 | 11.30 | 13.30 | 10.00 | 29.80 | 11.30 | 21.60 | 29.50 | 28.30 | 29.00 | 22.50 | 12.90 | 25.40 | 20.10 | 20.20 | 25.20 | 27.10 | 14.90 | 21.20 | 16.80 |
| Final Forecast | 16.7084 | 21.2259 | 19.18 | 22.9335 | 20.1302 | 20.6713 | 18.6771 | 20.8387 | 27.9778 | 21.2423 | 21.968344 | 23.7421 | 19.0089 | 24.9235 | 17.8373 | 22.4234 | 26.8856 | 23.7392 | 18.4807 | 24.5558 | 20.5788 |

DEMAND FORECASTING USING WEIGHTED MIXED MACHINE LEARNING MODELS

FIELD

One embodiment is directed generally to a computer system, and in particular to a computer system that forecasts demand.

BACKGROUND INFORMATION

Products are typically delivered to consumers through a network of manufacturers, distributors, transporters, retailers, etc. Such a network of facilities that together deliver products to consumers is commonly referred to as a "supply chain" network Suppliers of products (e.g., manufactures, vendors, retailers, etc.) often face the task of forecasting the demand for the products in order to provide a smooth and efficient flow of the products through the supply chain network in the presence of constantly-changing market conditions. Overestimating the demand can result in overproduction and increased costs associated with holding inventories (e.g., storage costs, obsolescence, etc.). Underestimating the demand, on the other hand, can result in lost revenues.

Further, in the retail industry, retailers need to predict their demand in the future to better manage their inventory or promotion/markdown planning. Retailers may engage in many types of promotion to boost their sales. To generate an accurate forecast, a retailer has to consider all factors which could impact the demand, such as promotions, price, seasonality, weather, etc.

One technique for forecasting demand for a product is to forecast the demand based primarily on historical demand information for that product (e.g., based on past purchase orders, past shipments, past point-of-sales data, and so on). However, such a technique may poorly adapt to the ever-changing market conditions and can result in an inaccurate forecast. Further, with more and more factors to consider, the traditional forecast method such as time series analysis or regression does not work very well.

SUMMARY

Embodiments forecast demand of an item by receiving historical sales data for the item for a plurality of past time periods, the historical sales data including a plurality of features that define one or more feature sets. Embodiments use the feature sets as inputs to one or more different algorithms to generate a plurality of different models. Embodiments train each of the different models with a same training set to generate a plurality of trained models. Embodiments use each of the trained models to generate a plurality of past demand forecasts for each of some or all of the past time periods and generate a plurality of future demand forecasts for each of future time periods. Embodiments determine a root-mean-square error ("RMSE") for each of the past demand forecasts and, based on the RMSE, determine a weight for each of the trained models and normalize each weight. Embodiments then generate a final demand forecast for the item for each future time period by combining a weighted value for each trained model.

BRIEF DESCRIPTION OF THE DRAWINGS

FIGS. 3 and 4 illustrate a numerical example of determined demand forecasts for a single SKU in accordance with embodiments of the invention.

DETAILED DESCRIPTION

One embodiment forecasts a demand of a product by training multiple algorithms/methods and multiple features using historical sales data input resulting in multiple trained models, and then weighting each of the trained models based on an error value. Using the weights and the multiple models, the demand forecast is generated by combining a weighted forecast generated by each of the trained models.

Sales and demand forecasting methods can roughly be grouped into judgmental, extrapolation, and causal methods. Extrapolation methods use only the time series data of the activity itself to generate the forecast. Known particular algorithms/methods range from the simpler moving averages and exponential smoothing methods to the more complicated Box-Jenkins approach. While these known methods identify and extrapolate time series patterns of trend, seasonality and autocorrelation successfully, they do not take external factors such as price changes and promotion into account.

Vector Auto Regression ("VAR") methods extend the Box-Jenkins methods to include other variables, but their complexity makes estimation difficult. Causal forecasting involves building quantitative models using inputs representing the phenomena that are believed to be drivers of the outcome. The methods can be as simple as a linear regression algorithm with promotion variables. A starting point is a regression model with promotion variables such as price cuts, rebates or advertisements. The idea is that model simplicity helps managers to understand and approve or guide modification of the models, and as they become more knowledgeable about a decision aid, they may be ready to implement more sophisticated and complex models.

In order to improved demand forecasting, retailers have begun to move to modern machine learning technologies, such as support vector machine ("SVM"), artificial neural network ("ANN"), random forest, and so on. However, typically a retailer will just pick one model for each product/location. As used herein, a retailer can include a single retail store, or can include a large amount of retail stores all integrated and managed by single or multiple logistic operations.

Further, for many machine learning algorithms (SVM, ANN, random forest, etc.), retailers will use the feature set to define the data point at the product/location/calendar intersection. In these algorithms, retailers will train the model with the same feature set as it does for forecasting. Further, the same feature set could be used by several different algorithms for forecast. A "feature set" is the collection of features that impact the demand for an item. Examples of features are price, seasonality, brand, promotions, size, color, pack size, supplier, length, etc. While features such as price and seasonality may be relevant for all types of products, some others are item specific. For example, pack size impacts the demand for yogurts, however the length is insignificant. Conversely, the brand is very important for fashion items, but is much less important for hardware items, such as nails or hammers.

In contrast with known approaches for demand forecasting that only select one model for each product/location, embodiments use multiple different trained models together to predict the demand for the retailer, and then generate weights using novel rules/algorithms that are used to combine the results.

Figure 1:
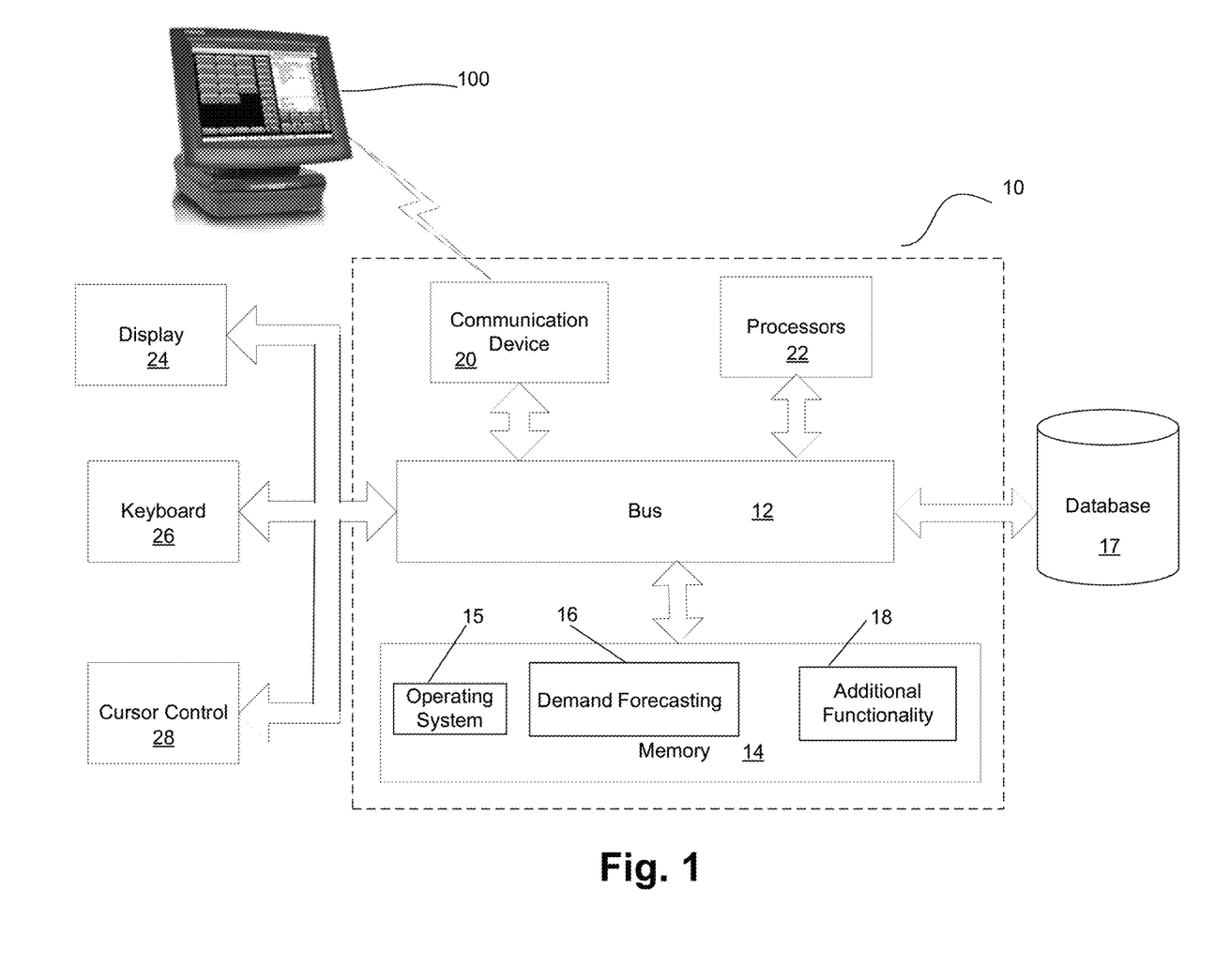
FIG. 1 is a block diagram of a computer server/system in accordance with an embodiment of the present invention.

FIG. 1 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of a server, system 10 may need to include a processor and memory, but may not include one or more of the other components shown in FIG. 1, such as a keyboard or display.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a promotion effects module 16 that determines demand forecasting, and all other functionality disclosed herein. System 10 can be part of a larger system. Therefore, system 10 can include one or more additional functional modules 18 to include the additional functionality, such as a retail management system (e.g., the "Oracle Retail Demand Forecasting System" or the "Oracle Retail Advanced Science Engine" ("ORASE") from Oracle Corp.) or an enterprise resource planning ("ERP") system. A database 17 is coupled to bus 12 to provide centralized storage for modules 16 and 18 and store customer data, product data, transactional data, etc. In one embodiment, database 17 is a relational database management system ("RDBMS") that can use Structured Query Language ("SQL") to manage the stored data. In one embodiment, a specialized point of sale ("POS") terminal 100 generates the transactional data and historical sales data (e.g., data concerning transactions of each item/SKU at each retail store) used to forecast demand. POS terminal 100 itself can include additional processing functionality to forecast demand in accordance with one embodiment.

In one embodiment, particularly when there are a large number of retail stores, a large number of items, and a large amount of historical data, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as a IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

Embodiments use the multiple trained models generated from one or more different algorithms in order to estimate a sales forecast or a demand forecast. The forecast is an important driver of the supply chain. If a forecast is inaccurate, allocation and replenishment perform poorly, resulting in financial loss for the retailer. Improvements in forecast accuracy for promoted or non-promoted items may be achieved by the embodiments disclosed herein. Further, a better understanding of the impact a promotion has on demand may be achieved. This helps the retailer to more effectively plan promotions with respect to channel, pricing, and customer segments, for example.

Embodiments are disclosed from the perspective that, for an item (e.g., a retail item represented by an SKU) sold at a location (e.g., a retail location), the item may be promoted in various ways at various times (i.e., pre-defined retail periods, such as a day, week, month, year, etc.). A retail calendar has many retail periods (e.g., weeks) that are organized in a particular manner (e.g., four (4) thirteen (13) week quarters) over a typical calendar year. A retail period may occur in the past or in the future. Historical sales/performance data may include, for example, a number of units of an item sold in each of a plurality of past retail periods as well as associated promotion data (i.e., for each retail period, which promotions were in effect for that period).

As disclosed below, embodiments use one or more trained models generated from one or more different algorithms and generate weights for the trained models. Trained models used in some embodiments can include trained linear regression models or machine learning techniques, such as decision or regression trees, Support Vector Machines ("SVM") or neural networks.

In connection with trained linear regression models, generated from a linear regression algorithm trained with different inputs, the search for a linear relationship between an output variable and multiple input variables has resulted in stepwise selection of input variables in a regression setting. In some embodiments, the goal is to build a function that expresses the output variable as a linear function of the input variables plus a constant. Two general approaches in stepwise regression are forward and backward selection.

In forward selection, variables are introduced one at a time based on their contribution to the model according to a pre-determined criterion. In backward selection, all input variables are built into the model to begin with, and then input variables are removed from the regression equation if they are judged as not contributing to the model, again based on a predetermined criterion.

In machine learning, SVMs are supervised learning models with associated learning algorithms that analyze data used for classification and regression analysis. Given a set of training examples, each marked as belonging to one or the other of two categories, an SVM training algorithm builds a model that assigns new examples to one category or the other, making it a non-probabilistic binary linear classifier. An SVM model is a representation of the examples as points in space, mapped so that the examples of the separate categories are divided by a clear gap that is as wide as possible. New examples are then mapped into that same space and predicted to belong to a category based on which side of the gap they fall.

In addition to classification, SVMs have been successfully applied in sales or demand forecasting, being able to process common metrics, such as sales, as well as price, promotions, external factors such as weather and demographic information.

SVM and its regression version of Support Vector Regression ("SVR") implicitly map instances into a higher dimensional feature space using kernel functions. In its most basic form, SVR ideally seeks to identify a linear function in this space that is within a distance to the mapped output points. This "soft margin formulation" allows and penalizes deviations beyond the pre-determined distance, and minimizes the sum of violations along with the norm of the vector that identifies the linear relationship A regression tree technique partitions the data into smaller subsets in a decision tree format and fits a linear regression model at every leaf that is used to predict the outcome. Alternative model tree approaches differ from each other mainly in the choice criteria of the input variable to be branched on, split criteria used, and the models constructed at every leaf of the tree. While trees are transparent in the sense that the prediction for a particular case can be traced back to the conditions in the tree and the regression function that is applicable for cases that satisfy those conditions, trees with many layers are not easy to interpret in a generalizable manner.

An Artificial Neural Network ("ANN") is an information processing paradigm that is inspired by the way biological nervous systems, such as the brain, process information. The key element of this model is the novel structure of the information processing system. It is composed of a large number of highly interconnected processing elements (i.e., neurons) working in unison to solve specific problems. ANNs learn by example. An ANN is configured for a specific application, such as pattern recognition or data classification, through a learning process. Learning in biological systems involves adjustments to the synaptic connections that exist between the neurons. This is true of ANNs as well. Since neural networks are best at identifying patterns or trends in data, they are well suited for prediction or forecasting needs.

Figure 2:
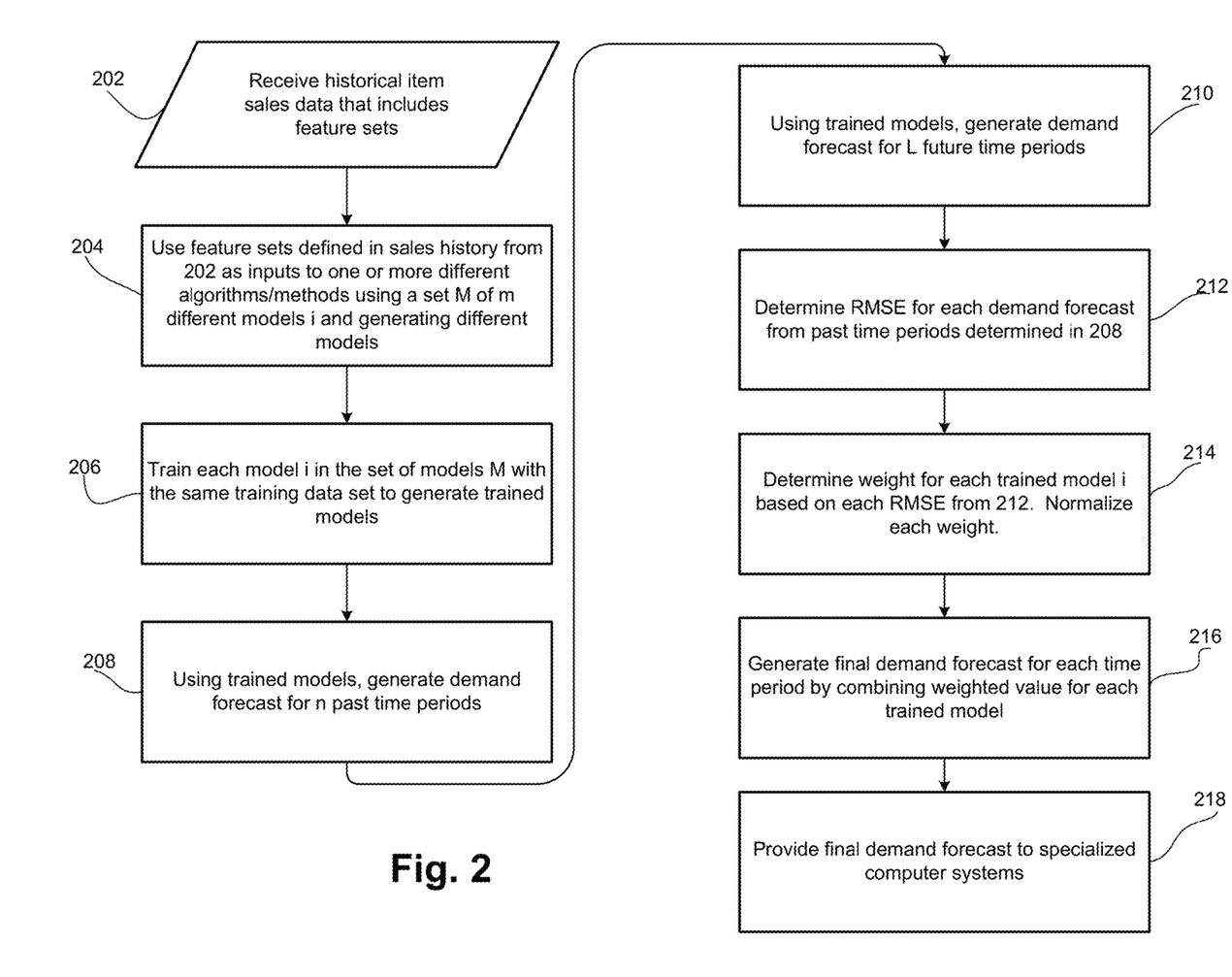
FIG. 2 is a flow diagram of the functionality of the demand forecast module of FIG. 1 when determining a demand forecast in accordance with one embodiment.

FIG. 2 is a flow diagram of the functionality of demand forecast module 16 of FIG. 1 when determining a demand forecast in accordance with one embodiment. In one embodiment, the functionality of the flow diagram of FIG. 2 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 202, historical item sales data is received for all items for all stores for a particular class/category of products. For example, the class/category can be "yogurt", "coffee" or "milk." Each class has one or more subclasses, all the way down to the SKU or Universal Product Code ("UPC") level, which would be each individual item for sale, For example, for the class of yogurt, a sub-class could be each brand of yogurt, and further sub-classes could be flavor, size, type (e.g., Greek or regular), down to an SKU which would correspond to every individual different type of yogurt item sold. Each SKU or UPC would be considered a discrete data point or discrete item.

Historical sales and performance data may include, for example, data representing past sales and promotions of an item across a plurality of past retail periods. The historical performance data may be segmented into retail periods of past weeks, with each past week having numerical values assigned to it to indicate the number of items sold for that week. The historical performance data may also include numerical values representing price discounts and values of other promotion components across the retail periods, in accordance with one embodiment. The historical performance data for an item may be accessed at a central location via network communications, in accordance with one embodiment, including being accessed from each POS terminal 100 at each retail store and/or accessed from database 17.

Figure 4:
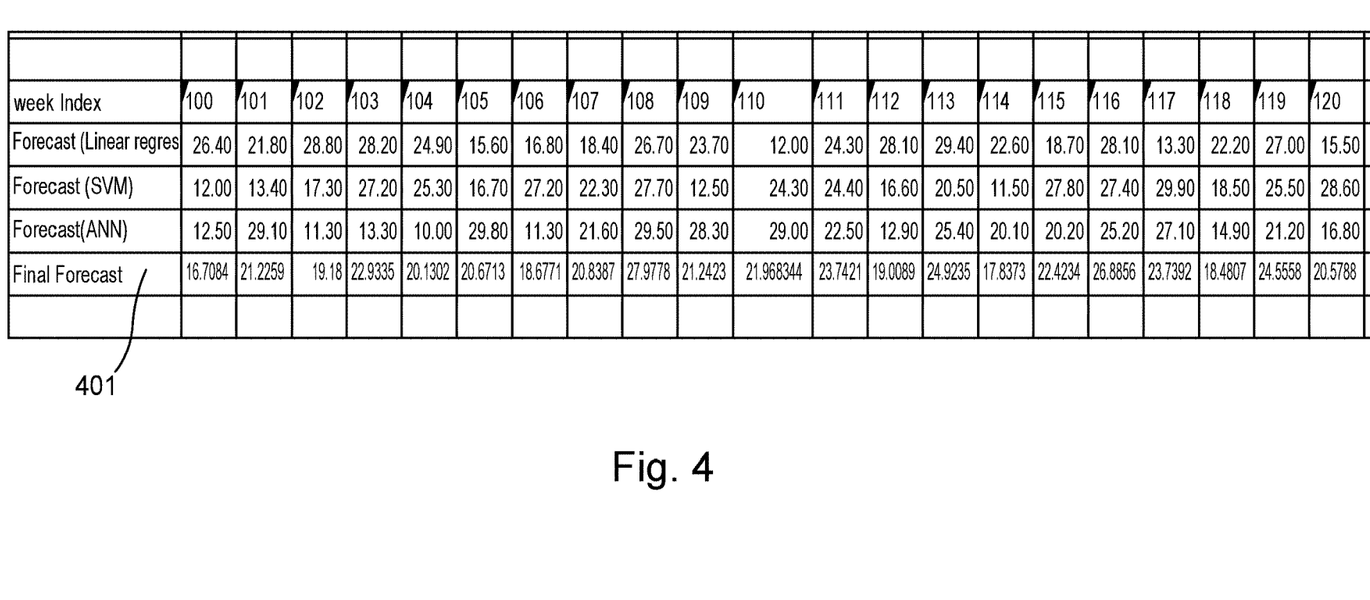

In one example embodiment shown in FIGS. 3 and 4, the historical sales data is for a single SKU and includes 100 past weeks (i.e., weeks 1-99, where week "99" is the last most recent past week of historical data, and week "100" is the first week in the future) of data for a given product/location (i.e., a single retail location among many retail locations for a multi-location retailer). The goal in this example embodiment is to forecast the demand for the product at the location for the next/future 20 weeks (i.e., weeks 100-120). FIG. 3 only shows past weeks 90-99 (at 301) (i.e., weeks 1-89 are not shown).

The historical sales data from 202 includes multiple features from which multiple feature sets can be formed/ defined and used as input to one or more different algorithms/methods to generate multiple different models. For example, one feature set may include price, brand, and color, and a second feature set may include price, seasonality and supplier.

At 204, feature sets defined by the sales history from 202 are used as inputs to generate one or more different algorithms/methods. In the example embodiment shown in FIGS. 3 and 4, three types of algorithms are used: Linear regression (row 310), SVM (row 311) and ANN (row 312). Instead of different types of algorithms, a single type of algorithm can be used that uses different feature sets as input and thus, for the purposes of embodiments, would ultimately generate different models. For example, for an SVM, two different models can be used, with one algorithm having 10 features, and one model having 20 features. Or, for an ANN, one model may include 1 hidden layer and 10 nodes, while one model may include 2 hidden layers and 5-7 nodes. Embodiments define a feature set to describe the data points which could be used to train/predict the demand forecast for each model of a set of multiple machine learning models ("M"), where the set includes "m" models.

At 206, embodiments train each model "i" in the set of models M with the same training data set. For each model, embodiments generate a final trained model T(i). The training data set can include historical information that impacts demand, such as price data, sales data, as well as values of the selected features. For example, if the item is a t-shirt, the features and their values may be: brand: Bolo, color: pink, size: medium, style: v-neck, price: $15, sales: 13 units.

At 208, embodiments generate the demand forecast for "n" (10 in the example of FIGS. 3 and 4) weeks earlier than the supposed forecast start date (week 100 in the example) using the trained models from 206. To predict the forecast for L weeks (e.g., 100) starting at calendar index k (e.g., 100) instead of using the set of models to predict the demand time series at week (k, k+1, . . . , k+L−1), embodiments predict an extra n week start at calendar index k−n (e.g., 100−10=90). Therefore, the predicted forecast time series will be at (k−n, k−n−1, . . . , k, k+1, . . . , k+L−1). As shown in FIG. 3, each trained model (i.e., linear regression (row 310), SVM (row 311) and ANN (row 312)) is used to generate a demand forecast for weeks 90-99, which are the n weeks for which there is historical sales data (i.e., not a future demand forecast).

At 210, the demand forecast for future weeks (i.e., weeks 100-120) are determined using each of the trained models from 206, as shown at the columns of 301 and 302. In general, for each models in the set of models M, the trained model T(i) is applied to predict the forecast F(i) from week k−n to k+L−1 for a given product/location.

At 212, the root-mean-square error ("RMSE") R(i) is determined for each of the forecasts F(i) for the periods from k−n to k−1 (i.e., the weeks prior to the forecast period), or weeks 90-99 in the example of FIGS. 3 and 4). In one example, the RMSE is determined by starting the forecast "n" weeks earlier than the present time period (i.e., the last period for which there are sales). Therefore, for these n weeks there is both sales data and a forecast that can be generated. With sales data and the forecast, the RMSE can be calculated using known RMSE calculations. In the example of FIGS. 3 and 4, the RMSE determinations for the forecast using the three trained models or methods from week 90 to week 99 are as follows:

| | |
|---|---|
| RMSE(Linear regression) | 7.08 |
| RMSE(SVM) | 7.96 |
| RMSE(ANN) | 7.40 |

At 214, a weight is determined/assigned for each method/trained model "i" based on the RMSE determined at 212 as follows:

$$W(i)=1/R(i).$$

Each weight is then normalized as follows:

$$W'(i)=W(i)/\Sigma_{j=1}^{m} W(j)$$

which adds all the weights together, and normalizes the individual weights such that their sum equals to 1.0. For example, there may be two trained models with the corresponding RMSEs being 0.143 and 0.167, respectively. The weights are the reciprocal of the RMSE, so 7 and 6, respectively. The weights after normalizing are: 6/(6+7)= 0.462 and 7/(6+7)=0.538. In the example of FIGS. 3 and 4, the determined weights are as follows:

| | |
|---|---|
| Weight(Linear regression) | 0.32 |
| Weight(SVM) | 0.35 |
| Weight(ANN) | 0.33 |

At 216, the final forecast is determined by combining each weighted value for each trained model of the previously determined forecasts. Embodiments combine the final forecast at week "x" as F'(x)=sum(w'(i)*f(i,x)), where x denotes the week index from k to k+L−1, and i denotes the trained model. The final demand forecast is shown in FIG. 4 at row 401.

At 218, the final demand forecast is used for manufacturing production, shipping logistics, and inventory control. The final demand forecast is sent to other specific purpose computers in one embodiment, such as an inventory control system, a manufacturing system, a shipping and logistics system, and a sales assistance system. The final demand forecast in one embodiment is in the form of individual data bits that have been translated from the demand forecast and that are stored and transmitted to other specialized computer systems, where they are stored and utilized by those systems. As a result, additional items may be manufactured, stored, shipped, etc. and items can be optimally priced.

As disclosed, one goal of embodiments is to select the relevant features for items to ultimately maximize forecast accuracy. A good forecast generally receives no credit. Items are always available and they sell at the full price, as opposed to discounted prices. Inventory levels should not be too high, so retailers do not have money tied up in inventory. Retailers and suppliers should be able to reliably plan workforce and production capacity.

However, if the forecast is wrong (i.e., not accurate) the picture changes dramatically. The effects can have a negative impact on many business areas. For example, if the forecast is too low, fewer than needed products arrive at the retailer and they sell out. An out of stock situation impacts a retailer through lost revenue and reduced customer satisfaction. A low forecast also impacts suppliers, which have to scale down production, and review their need for the current workforce.

If the forecast is too high, there are also negative effects. The retailers will order more than they can sell. If the products are perishable, they may go bad, increasing wastage. Even if they are not perishable, the retailers may sell the extra items at discounted prices, which negatively affects revenue. The retailers may otherwise return the merchandise to the suppliers. This impacts the suppliers because they have extra products for which there is no demand. Further, the manufacturers may waste time and money producing the wrong thing, which negatively affects the supplier's revenue.

Figure 5:
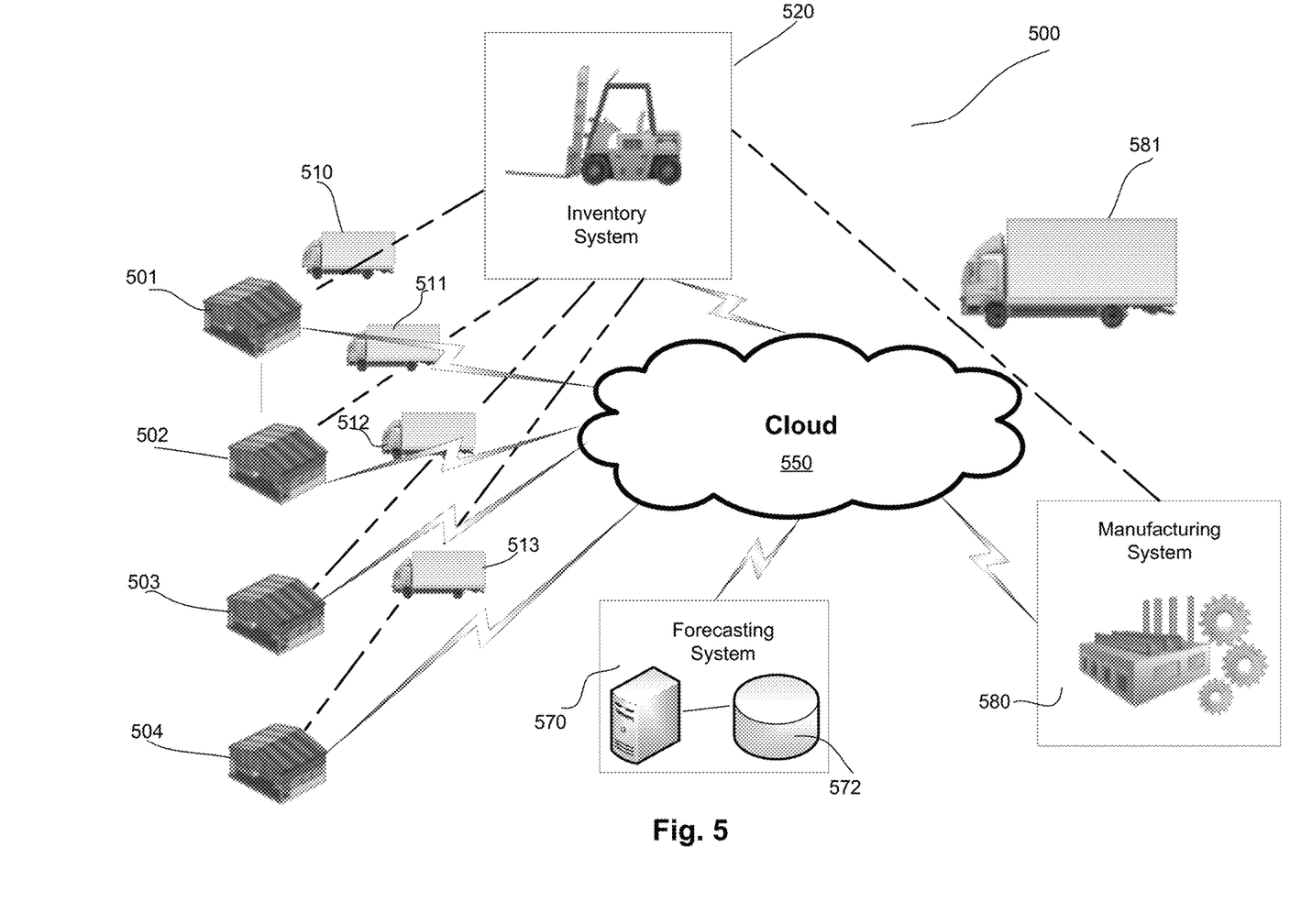
FIG. 5 illustrates an integrated manufacturing, inventory and logistics system that includes demand forecasting as disclosed herein in accordance with one embodiment.

FIG. 5 illustrates an integrated manufacturing, inventory and logistics system 500 that includes demand forecasting as disclosed herein in accordance with one embodiment. As shown in FIG. 5, system 500 can include a product forecasting system 570 that forecasts future product demand and in some instances forecasts and/or considers future demand for hundreds of thousands of products, or in some applications tens of millions or more products at one or more retail stores 501-504. Forecasting system 570 is in communication through a cloud network 550 or other type of communications network with one or more inventory systems 520 and one or more manufacturing systems 580.

Forecasting system 570 generates demand forecasting by implementing the functionality disclosed in conjunction with FIG. 2 above. Inventory system 520 stores inventory and provides transportation logistics to deliver items to stores 501-504 using trucks 510-513 or some other transportation mechanisms. Inventory system 520 in one embodiment implements an Enterprise Resource Planning ("ERP") specialized computer system or a specialized inventory control system that uses input from forecasting system 510 to determine levels of inventories and the amount and timing of the delivery of items to stores 501-504.

Manufacturing system 580 manufactures items to be sent to inventory system 520 and provides transportation logistics to deliver the items to inventory system 520 using a truck 581 or some other transportation mechanisms. Manufacturing system 580 in one embodiment implements an ERP specialized computer system or a specialized manufacturing system that uses input from forecasting system 570 to determine an amount of items to manufacture, inventory of resources that are used for the manufacturing, and the amount and timing of the delivery of items to inventory system 520.

Forecasting system 570 can utilize information from inventory system 520, a sales tracking system (not shown) and/or databases in forecasting demand for products. In forecasting demand, forecasting system 570 attempts to predict uncharacteristic demand of one or more products that results from events, weather, social demand, economic factors and other factors. Tens, to hundreds to thousands of different variables may be tracked that can have an effect on the demand of one or more products. Changes in these variables can result in uncharacteristic demands. For example, changes in forecasted weather can be tracked, and one or more variables associated with the forecasted weather can be used in determining whether such a change is weather may have an effect on demand, and may further forecast a change in demand.

In general, the elements of FIG. 5 perform sales, manufacturing, or consumption of inventory. Retail locations/stores 501-504 for direct consumer sales exhibit the most volatile inventory patterns, due to the random nature and external factors affecting sales. However, manufacturing facilities and sites that consume inventory (such as product integrators, internet shippers, etc. products used in the local facility) also benefit from demand forecasting as disclosed herein. As disclosed, each retail location 501-504 sends sales data and historic forecast data to forecasting system 570. The sales data includes inventory depletion statistics for each item, or SKU/UPC for each sales period, typically days, in the previous sales cycles (i.e. weeks), typically 4-7 weeks of inventory cycles.

Forecasting system 570 stores the sales data in a repository 572, and employs the sales data for generating orders to replenish inventory. The orders include a set of items and a quantity for each item for maintaining the inventory level at a store 501-504.

Many retail ordering schemes rely on days of the week for sales periods and sales cycles. In one configuration, in an inventory management environment having inventory statistics, in which the inventory statistics are specific to each day of the week, inventory system 520 determines target inventory levels by gathering, for each day of the week, inventory level statistics from previous sales. Embodiments compute, based on the inventory level statistics, an inventory level for each day of the week, such that the safety stock accommodates variations in inventory between the different days of the week. Embodiments render, for each of a plurality of items, a stocking level indicative of the target inventory level including the safety stock for each day of the week. Embodiments compute an ordering quantity based on a lead time such that the ordered quantity arrives to satisfy the rendered stocking level on the determined day of the week. Identifying the actual stock levels includes identifying stock levels on the day of the week from previous weeks from the history data, thus focusing on the same day of the week over time, rather than an average of all days in the week.

In particular configurations, the disclosed embodiments may be employed in conjunction with specialized and/or particularly high volume retail sales environments. In large logistics and distribution operations, it is beneficial to load trucks as full as possible, and in the event deferral of items to a successive trip is needed, to select those items which will have a least likely chance of interrupting sales activity. Accordingly, embodiments are operable in conjunction with POS system 100 to identify high velocity or high turnover items that tend to be sold and replenished faster than other items. A UPC bar code symbol or radio-frequency identification ("RFID") on an item includes a field, designation or value, that alone or in conjunction with a database lookup, designates an item as a high velocity item appropriate for safety stock treatment as defined herein.

A high velocity item may be accommodated by identifying, for each of a plurality of items represented in an inventory database, a field for a product identifier and a field denoting a safety stock for the item, and determining, for each of the product identifiers, a product segmentation field based on product velocity indicative of increased product replenishment demands resulting from a sales volume. The disclosed embodiments determine based on the velocity field, whether to compute a safety stock, i.e. whether the overhead and burden to resupply according to the safety stock is worthwhile given the product throughput.

In other embodiments, supply logistics may invoke a delivery frequency higher than one truck a day, hence triggering a resupply window with a higher granularity. In such a case, the safety stock may be more specific than an individual day, such as a Monday AM and Monday PM, or to designate multiple delivery or time windows within a particular day of the week, such as 7:00 AM, 11:00 AM and 4:00 PM.

Embodiments, including the generated demand forecast, may be employed in implementing supply logistics and designating deliveries (i.e., trucks) and manifest (i.e., contained items) in accordance with demand and profit margins of the transported items. High velocity items might be deemed to have priority space on a particular delivery, but could further be selected based on a profit margin or markup on the included items, and items with the greatest revenue generation potential selected for inclusion.

In such a product inventory shipping environment that uses the demand forecast disclosed herein and has a plurality of transport vehicles, each vehicle (e.g., truck) is configured for receiving a fixed payload of items for delivery to a sales location for inventory replenishment. Embodiments can provide guidance in loading a delivery vehicle, by, for each item of a plurality of items including a first item and a second item, computing a safety stock and determining, based on the computed safety stock of the first item and the second item, a quantity of each of the first item and the second item to be loaded into the delivery vehicle. Embodiments recompute a truck loading quantity based on the safety stock if insufficient space is available in the delivery vehicle for the determined quantity of the first item and the second item, meaning that certain items would need to be omitted and deferred to a successive delivery.

As disclosed, embodiments determine a demand forecast of one or more items for future sales periods. The demand forecast uses a plurality of weighted different trained models that have been trained and weighed based on past sales data. The generated demand forecast is then sent to other specialized systems to control manufacturing, inventory control, logistics and other functions for the forecasted items.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of forecasting demand of an item, the method comprising:
   receiving historical sales data for the item for a plurality of past time periods, the historical sales data comprising a plurality of features of the item that impact the demand of the item, the plurality of features comprising at least two or more different types comprised from at least two of price, seasonality, brand, promotions, size or color;
   defining a plurality of different feature sets, each feature set comprised of one or more features of the plurality of features from the historical sales data;
   using the plurality of different feature sets as inputs to one or more different algorithms to generate a plurality of different machine learning models, each of the different machine learning models corresponding to each of the different feature sets, each of the plurality of machine learning models generated and configured based on the types of features from each of the different feature sets, and each different feature set having a different number of features of the plurality of features and/or different types of features of the plurality of features;
   wherein the different machine learning models each have a same algorithm, each same algorithm having a different number of features corresponding to one of the different feature sets, or the different machine learning models each have the same algorithm, each same algorithm having a different number of nodes corresponding to one of the different feature sets, or the different machine learning models each have a different algorithm, each different algorithm corresponding to one of the different feature sets, the different algorithms comprising at least two of linear regression, Support Vector Machine, or Artificial Neural Networks;
   after generating each of the different machine learning models, training each of the different machine learning models with a same training set to generate a plurality of trained models, the training set generated from the historical sales data and comprising a plurality of values, each of the values corresponding to one of the types of features;
   using each of the trained models, generating a plurality of past demand forecasts for each of some or all of the past time periods and generating a plurality of future demand forecasts for each of future time periods;
   determining a root-mean-square error (RMSE) for each of the past demand forecasts;
   based on the RMSE, determining a weight for each of the trained models and normalizing each weight; and
   generating a final demand forecast for the item for each of the future time periods by combining a weighted value for each trained model.

2. The method of claim 1, wherein the weight (W(i)) is determined from the RMSE (R(i)) as follows: W(i)=1/R(i).

3. The method of claim 2, wherein each weight is normalized as follows:

$$W'(i)=W(i)/\Sigma_{j=1}^{m}W(j).$$

4. The method of claim 3, wherein the final demand forecast (F'(x)) at week (x) comprises F'(x)=sum(w'(i)*f(i, x)).

5. The method of claim 1, wherein the final demand forecast is transmitted to a specialized inventory management system and a specialized manufacturing system.

6. The method of claim 1, further comprising:
   based on the final demand forecast, causing an amount of the item to be delivered to stores via a transportation mechanism.

7. A non-transitory computer-readable medium having instructions stored thereon that, when executed by a processor, cause the processor to forecast demand of an item, the forecast comprising:
   receiving historical sales data for the item for a plurality of past time periods, the historical sales data comprising a plurality of features of the item that impact the demand of the item, the plurality of features comprising at least two or more different types comprised from at least two of price, seasonality, brand, promotions, size or color;
   defining a plurality of different feature sets, each feature set comprised of one or more features of the plurality of features from the historical sales data;
   using the plurality of different feature sets as inputs to one or more different algorithms to generate a plurality of different machine learning models, each of the different machine learning models corresponding to each of the different feature sets, each of the plurality of machine learning models generated and configured based on the types of features from each of the different feature sets, and each different feature set having a different number of features of the plurality of features and/or different types of features of the plurality of features;
   wherein the different machine learning models each have a same algorithm, each same algorithm having a different number of features corresponding to one of the different feature sets, or the different machine learning models each have the same algorithm, each same algorithm having a different number of nodes corresponding to one of the different feature sets, or the different machine learning models each have a different algorithm, each different algorithm corresponding to one of the different feature sets, the different algorithms comprising at least two of linear regression, Support Vector Machine, or Artificial Neural Networks;

after generating each of the different machine learning models, training each of the different machine learning models with a same training set to generate a plurality of trained models, the training set generated from the historical sales data and comprising a plurality of values, each of the values corresponding to one of the types of features;

using each of the trained models, generating a plurality of past demand forecasts for each of some or all of the past time periods and generating a plurality of future demand forecasts for each of future time periods;

determining a root-mean-square error (RMSE) for each of the past demand forecasts;

based on the RMSE, determining a weight for each of the trained models and normalizing each weight; and generating a final demand forecast for the item for each of the future time periods by combining a weighted value for each trained model.

8. The computer-readable medium of claim 7, wherein the weight (W(i)) is determined from the RMSE (R(i)) as follows: W(i)=1/R(i).

9. The computer-readable medium of claim 8, wherein each weight is normalized as follows:

$$W'(i) = W(i)/\Sigma_{j=1}^{m} W(j).$$

10. The computer-readable medium of claim 9, wherein the final demand forecast (F'(x)) at week (x) comprises F'(x)=sum(w'(i)*f(i,x)).

11. The computer-readable medium of claim 7, wherein the final demand forecast is transmitted to a specialized inventory management system and a specialized manufacturing system.

12. The computer-readable medium of claim 7, the forecast further comprising:

based on the final demand forecast, causing an amount of the item to be delivered to stores via a transportation mechanism.

13. A demand forecasting system comprising:

a processor coupled to a storage device that implements a demand forecasting module to forecast demand of an item comprising:

receiving historical sales data for the item for a plurality of past time periods, the historical sales data comprising a plurality of features of the item that impact the demand of the item, the plurality of features comprising at least two or more different types comprised from at least two of price, seasonality, brand, promotions, size or color;

defining a plurality of different feature sets, each feature set comprised of one or more features of the plurality of features from the historical sales data;

using the plurality of different feature sets as inputs to one or more different algorithms to generate a plurality of different machine learning models, each of the different machine learning models corresponding to each of the different feature sets, each of the plurality of machine learning models generated and configured based on the types of features from each of the different feature sets, and each different feature set having a different number of features of the plurality of features and/or different types of features of the plurality of features;

wherein the different machine learning models each have a same algorithm, each same algorithm having a different number of features corresponding to one of the different feature sets, or the different machine learning models each have the same algorithm, each same algorithm having a different number of nodes corresponding to one of the different feature sets, or the different machine learning models each have a different algorithm, each different algorithm corresponding to one of the different feature sets, the different algorithms comprising at least two of linear regression, Support Vector Machine, or Artificial Neural Networks;

after generating each of the different machine learning models, training each of the different machine learning models with a same training set to generate a plurality of trained models, the training set generated from the historical sales data and comprising a plurality of values, each of the values corresponding to one of the types of features;

using each of the trained models, generating a plurality of past demand forecasts for each of some or all of the past time periods and generating a plurality of future demand forecasts for each of future time periods;

determining a root-mean-square error (RMSE) for each of the past demand forecasts;

based on the RMSE, determining a weight for each of the trained models and normalizing each weight; and generating a final demand forecast for the item for each of the future time periods by combining a weighted value for each trained model.

14. The system of claim 13, wherein the weight (W(i)) is determined from the RMSE (R(i)) as follows: W(i)=1/R(i).

15. The system of claim 14, wherein each weight is normalized as follows:

$$W'(i) = W(i)/\Sigma_{j=1}^{m} W(j).$$

16. The system of claim 15, wherein the final demand forecast (F'(x)) at week (x) comprises F'(x)=sum(w'(i)*f(i, x)).

17. The system of claim 13, wherein the final demand forecast is transmitted to a specialized inventory management system and a specialized manufacturing system.

18. The system of claim 13, the demand forecasting module further comprising:

based on the final demand forecast, causing an amount of the item to be delivered to stores via a transportation mechanism.

* * * * *